(12) United States Patent
McGinnes (10) Patent No.: US 7,182,568 B2
(45) Date of Patent: Feb. 27, 2007

(54) BALE HANDLING APPARATUS

(76) Inventor: Coy C. McGinnes, 2184 VZC Rd. 2120, Canton, TX (US) 75103

( * ) Notice: Subject to any disclaimer, the term of this patent is extended or adjusted under 35 U.S.C. 154(b) by 66 days.

(21) Appl. No.: 10/992,171

(22) Filed: Nov. 17, 2004

(65) Prior Publication Data

US 2005/0069405 A1    Mar. 31, 2005

Related U.S. Application Data

(63) Continuation-in-part of application No. 10/294,085, filed on Nov. 14, 2002, now abandoned.

(51) Int. Cl.
*B60P 3/00*    (2006.01)
(52) U.S. Cl. ............ 414/24.5; 414/703; 414/722; 414/911; 414/920
(58) Field of Classification Search ............ 414/24.5, 414/24.6, 703, 722, 911, 920, 686
See application file for complete search history.

(56) References Cited

U.S. PATENT DOCUMENTS 5,178,505 A * 1/1993 Smith ................. 414/24.5

* cited by examiner

*Primary Examiner*—Donald Underwood
(74) *Attorney, Agent, or Firm*—Rick Matos; Innovar, L.L.C.

(57) ABSTRACT

The invention provides a bale handling apparatus capable of being used to lift and transport two similar bales in a substantially side-by-side manner. The apparatus includes at least two vertically and horizontally offset main spears. Each main spear is grouped with at least one vertically and/or horizontally offset stabilizer spear. By virtue of the offset design of the main spears, the apparatus can be used to load two bales sequentially by lifting a first bale and then lifting a second bale without unloading the first bale from the apparatus. The apparatus can also be used to load two bales simultaneously. The two bales can then be transported together to another location and unloaded from the apparatus sequentially or simultaneously.

28 Claims, 4 Drawing Sheets

BALE HANDLING APPARATUS

CROSS-REFERENCE TO EARLIER FILED APPLICATION

The present application is a continuation-in-part of and claims the benefit of priority of earlier filed U.S. application Ser. No. 10/294,085 filed Nov. 14, 2002 now abandoned.

FIELD OF THE INVENTION

The present invention concerns a bale handling apparatus capable of lifting and transporting two bales. More particularly, the invention concerns a hay bale lifting and transport apparatus comprising horizontally offset spears to facilitate the loading of a second bale while a first bale is already loaded onto the apparatus. The present apparatus also permits the simultaneously unloading of two bales.

BACKGROUND OF THE INVENTION

A number of U.S. Patents disclose hay bale transport devices. U.S. Pat. No. 4,120,405 to Jones et al. discloses a hay bale pickup device that has one main spear and two stabilizer spears. This device can lift and carry only one bale at a time.

U.S. Pat. No. 5,178,505 to Smith discloses a three-point hitch attachment with a hay mover. However, that mover is adapted to transport only one bale at a time. It includes only a single main spear and plural stabilizer spears. The mains spears are not vertically and horizontally offset as described herein. This type of apparatus cannot be used to individually load and simultaneously unload two bales.

French Patent No. 1,240,379 to Bergeon discloses a three-point hitch attachment with a hay mover that, as above, is adapted to transport only one bale at a time. It includes four main spear that are horizontally, but not vertically, offset and plural stabilizer spears. The mains spears are not vertically and horizontally offset as described herein. This type of apparatus cannot be used to individually load and simultaneously unload two bales.

U.S. Pat. No. 5,129,775 to Coats et al. discloses a hay bale-handling device including one main spear and four stabilizer spears. The vertical height of the device is hydraulically adjustable. This device can lift and carry only one bale at a time.

U.S. Pat. No. 4,527,935 to Fortenberry discloses a trailer-type hay bale transport device including one centrally mounted main spear and two laterally mounted stabilizer spears. The stabilizer spears are longer than the main spear, and this device can lift only one bale at a time.

U.S. Pat. No. 4,674,786 to Lynch discloses a hay bale transport device having one main spear and two stabilizer spears. This patent also discloses the use of a reinforcing tubular brace that surrounds the main spear to add strength to the spear. This device can lift and transport only one bale at a time.

U.S. Pat. No. 4,249,842 to Johnson discloses a hay bale transport trailer having a hay bale loading device attached to it. The trailer can transport more than one bale; however, the loading device can only lift one bale at a time. The loading device has one main spear and two stabilizer spears.

U.S. Pat. No. 4,306,825 to Yilit discloses a hay bale handling device for use on a three-point tractor hitch. The device can lift and transport two bales at a time. The device includes two spear assemblies, each assembly comprising a main spear and a stabilizer spear. The main spear and stabilizer spear in an assembly are in fixed relation to one another, meaning that they do not move with respect to one another. However, each assembly moves independently of the other, since each assembly is hydraulically operated. During operation, a first assembly is used to impale and lift a first bale. Then a second bale is impaled and lifted with the second assembly. The main spears are pivotally mounted onto the frame and their pitch is adjustable by way of the hydraulic mechanism. The proximal base of the main spears is not vertically offset from one another. This type of apparatus is disadvantageous since it requires more maintenance and is subject to breakdown due to the use of hydraulics to adjust the pitch of the spears.

Thus, none of the known art discloses a hay bale-handling apparatus capable of picking up two bales individually from the ground and carrying them in tandem and then unloading them individually or in tandem. Due to the need to improve farming efficiency while reducing labor costs, a need remains for improved hay bale handling equipment.

SUMMARY OF THE INVENTION

The present invention seeks to overcome some or all of the disadvantages inherent in the art. The present invention provides a low maintenance bale handling apparatus having at least two vertically and horizontally offset impaling spears and at least two stabilizer spears and being capable of lifting and carrying at least two bales. The apparatus is adapted for use with a tractor, and a specific embodiment is adapted for mounting onto a three-point hitch of a tractor. The apparatus is used as follows. The first main spear has a higher vertical offset, relative to the ground or the base of the apparatus, than the second main spear. The apparatus is mounted onto a tractor, for example, and its vertical height relative to the ground is adjusted such that the first main spear is directed at a first bale. The tractor is then moved toward a first bale such that the first main spear and a corresponding first stabilizer spear, substantially to their hilts, impale the first bale. The first bale is then lifted a first height and the second main spear is directed at a second bale. The tractor is then moved toward the second bale such that the second main spear and a corresponding second stabilizer spear, substantially to their hilts, impale the second bale. The second bale is then lifted off the ground and the first and second bales are ready for simultaneous transport to a desired location. In a preferred embodiment, the vertical offset of the main spears is such that both bales can be unloaded simultaneously when the apparatus is lowered and the spears retracted. Alternatively, the bales are unloaded in reverse order by placing the second bale down and moving the tractor to remove the second main spear and stabilizer spear from the second bale. The apparatus is lowered further until the first bale contacts the ground. The tractor is then moved to remove the first main spear and stabilizer spear from the first bale. The above is accomplished without the use of hydraulic mechanisms to adjust the vertical pitch of the main spears relative to one another.

The apparatus can be adapted for mounting onto the rear or front of a tractor. A specific embodiment is adapted for mounting onto the rear three-point hitch of a tractor. Another specific embodiment is adapted for mounting onto the front-end loader assembly of a tractor.

One aspect of the invention provides a bale handling apparatus comprising:

a mounting assembly;

a frame onto which the mounting assembly is attached;

a first set of spears comprising a first main spear and a spaced away first stabilizer spear; and a second set of spears comprising a second main spear and a spaced away second stabilizer spear; wherein the first and second sets of spears are horizontally offset from each other and are attached to the frame;

the base of the first main spear is vertically offset from the base of the second main spear, with respect to the frame; and the main spears are longer than the stabilizer spears.

Specific embodiments of the invention include those wherein: 1) the apparatus comprises plural first main spears; 2) the apparatus comprises plural second main spears; 3) the apparatus comprises plural first stabilizer spears; 4) the apparatus comprises plural second stabilizer spears; 5) the mounting assembly is adapted for mounting the apparatus onto a three-point hitch; 6) the base of the first main spear is vertically offset from the base of the second main spear by a distance of at least 8 inches; 7) the stabilizer spear is spaced away from the main spear by a distance of at least about 1 ft to about 1.5 ft. for a 4 ft. diameter bale or at least about 1.75 ft. to about 2.5 ft. for a 6 ft. diameter bale; 8) the first and second main spears are horizontally offset by a distance that is less than the average diameter of a bale that the apparatus is adapted to lift; 9) the first and second main spears are horizontally offset by a distance that is greater than the average diameter of a bale that the apparatus is adapted to lift; 10) the first and second main spears are horizontally offset by a distance that approximates the average diameter of a bale that the apparatus is adapted to lift; 11) each stabilizer spear is horizontally offset with respect to its respective main spear; 12) the mounting assembly comprises plural mounting brackets; 13) each set of spears comprises a single main spear and one or more stabilizer spears; 14) each set of spears comprises a single stabilizer spears; 15) the first and second main spears are horizontally offset by about 4.25 ft. to 7 ft., 4.25 ft. to 6.5 ft., 4 ft. to 5 ft., 4 ft. to 4.5 ft., or 6 ft. to 6.75 ft.; 16) the first and second main spears are vertically offset by about 6 in. to 12 in., 7 in. to 10 in., 7 in. to 9 in., or about 8 in.; 17) each main spear is about 36–48 in.; and/or 18) each stabilizer spear is approximately 16–24 in. in length; 18) the vertical offset of the main spears is adapted to permit sequential loading of two bales and simultaneous unloading of two bales.

BRIEF DESCRIPTION OF THE FIGURES

The following figures form part of the present description and describe exemplary embodiments of the claimed invention. In light of these figures and the description herein, the skilled artisan will be able to practice the invention without undue experimentation.

FIG. 2 depicts a top plan view of an alternate embodiment of the hay bale lifting and transport apparatus of FIG. 1a.

DETAILED DESCRIPTION OF THE INVENTION

The bale handling apparatus of the invention comprises a strong material capable of sustaining substantial weight, torque and leverage. A preferred material is metal. Suitable metals include steel, iron, cold rolled iron, angle iron, strengthened steel, chrome-plated steel or iron. The metal can be in the form of tubing, solid rod, bracket, angled bracket or any other format that retains structural integrity while lifting heavy objects.

Figure 1A:
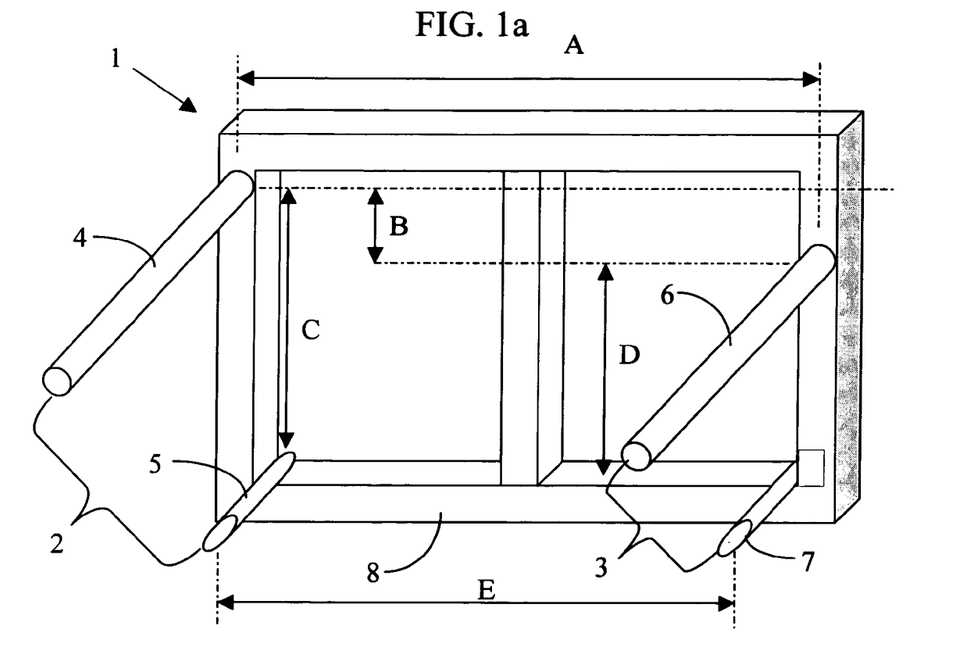
FIGS. 1a–1b depict a perspective view of a hay bale lifting and transport apparatus of the invention.

The exemplary bale handling apparatus (1) of FIG. 1 includes a first pair (2) and second pair (3) of spears. Each pair of spears comprises a main spear (4 or 6) and corresponding stabilizer spear (5, 7, respectively). The spears are attached to a frame (8), which includes a mounting assembly (not shown). The pairs (2, 3) are horizontally offset (spaced away) from each other by a distance (A). The main spears are vertically offset from each other by a distance (B). Likewise, the stabilizer spears are horizontally offset from each other by a distance (E). In this exemplary embodiment, the stabilizer spears (5, 7) are not vertically offset; therefore, the spacing (C) between the main spear (4) and the stabilizer spear (5) is different than the spacing (D) between the main spear (6) and the stabilizer spear (7).

The horizontal distance (A) between the main spears can be greater than, approximately equal to or less than the average diameter, average length or average width of a bale for which the apparatus (1) is adapted to lift. For example, if the apparatus is intended for use in lifting and transporting cylindrical bales, the distance (A) can be greater than, less than or approximately equal to the average diameter of the cylinder. The distance, however, will be sufficiently large to permit simultaneous transport of at least of the bales in side-by-side arrangement. Generally, the distance will be at least about 75%, 80%, 85%, 90% or 95% of the average diameter of the bale. In other embodiments, the distance (A) approximates (is within 95% to 105% of) the average diameter of the bale. In still other embodiments, the distance (A) is greater than (at least about 105%, 108%, 110%, 115%, or 120%, or greater than 120% of) the average diameter of the bale. The horizontal spacing between the main spears is generally less than two times the diameter of the largest bale for which the apparatus is adapted to lift.

The horizontal offset of the bales cannot be too great as such a design generally results in an unstable load that wobbles excessively during transport. In addition, it is generally desired to store bales immediately adjacent one another to optimize storage efficiency and minimize exposure of the surface of the bales to the elements (weather). However, if the horizontal offset of the main spears is to great, it becomes more difficult to unload bales immediately adjacent one another. In order to do so, an operator would have to unload the first bale, reorient the transport apparatus to place the bales closer to one another and then unload the second bale. If the horizontal offset between the two main spears is optimally placed, then the bales can be loaded individually and be unloaded simultaneously, without having to significantly reorient the transport apparatus, such that the bales are immediately adjacent one another after unloading. According to the intended results in loading and unloading of the bales, the first and second main spears are horizontally offset by about 4.25 ft. to 7 ft., 4.25 ft. to 6.5 ft., or 4 ft. to 5 the preferred range being about 4.25 ft. to 6.5 ft. For an about 4 ft. diameter round bale, the first and second main spears are generally horizontally offset by about 3.9 ft. to about 4.75 ft., or about 4 ft. to about 4.5 ft., or about 4 ft. to about 4.75 ft. For an about 6 ft. diameter round bale, the first and second main spears are generally horizontally offset by about 5.8 ft. to about 6.75 ft., or about 6 ft. to about 6.75 ft., or about 6 ft. to about 6.5 ft.

The vertical distance or offset (B) is at least about 5%, 8%, 10%, 15% or 20% of the average diameter of a bale for which the apparatus (1) is adapted to lift. By virtue of the vertical offset of the bases of the main spears, the present system does not require individually hydraulically controlled main spears such as the prior art system of Yilit (U.S. Pat. No. 4,306,825). Accordingly, the present apparatus requires less maintenance and is more cost effective than the prior art system. Also, the vertical offset between the main spears as set forth herein permits sequential loading of two bales onto and subsequent simultaneous unloading of two bales off of the apparatus. If the vertical offset of the main spears is not sufficient, then two bales cannot be loaded sequentially when speared in the center of each bale. If the vertical offset of the mains spears is too great, then the two bales cannot be unloaded simultaneously.

It is important to keep the vertical offset of the main spears from one another to within predetermined ranges as set forth herein. If the main spears are vertically offset too great a distance, the transport apparatus is torqued unnecessarily by the bales loaded onto it due to the pull of gravity upon each bale. As a result, it can occur that the transport apparatus will twist and yaw causing undue stress and, in some cases, catastrophic failure of the apparatus, such as by breaking of the mounting assembly and or breaking of one of the main spears. The twisting and skewing of the transport apparatus would be even greater when the apparatus is loaded with two bales and in motion during transport. Generally, the first and second main spears are vertically offset by about 4 in to 16 in, 6 in. to 12 in., 7 in. to 10 in., 7 in. to 9 in., or about 8 in., the preferred range being about 7 in. to 9 in. or about 8 in.

The vertical distances (C, D) between the main spears (4, 6) and the respective stabilizer spears (5, 7) is less than the average diameter of a bale which the apparatus is adapted to lift and transport. The distance (C, D) is generally from about 25% to about 85% or about 30% to about 75% or about 35% to about 65% of the average diameter of a bale which the apparatus is adapted to lift and transport. In one embodiment, the distance between a stabilizer spear and its respective main spear is generally at about 1 ft to 1.5 ft. in. for an apparatus adapted to transport bales about 4 ft. in diameter or for an apparatus wherein the main spears are horizontally offset by about 4 ft. to about 4.5 ft. In another embodiment, the distance between a stabilizer spear and its respective main spear is generally at about 1.25 ft to 2 ft. in. for an apparatus adapted to transport bales about 6 ft. in diameter or for an apparatus wherein the main spears are horizontally offset by about 6 ft. to about 6.75 ft.

The distance (E) between the stabilizer spear(s) of the first pair (2) and the second pair (3) can be any distance provided that the stabilizer spears remain spaced away from each other.

Figure 1B:
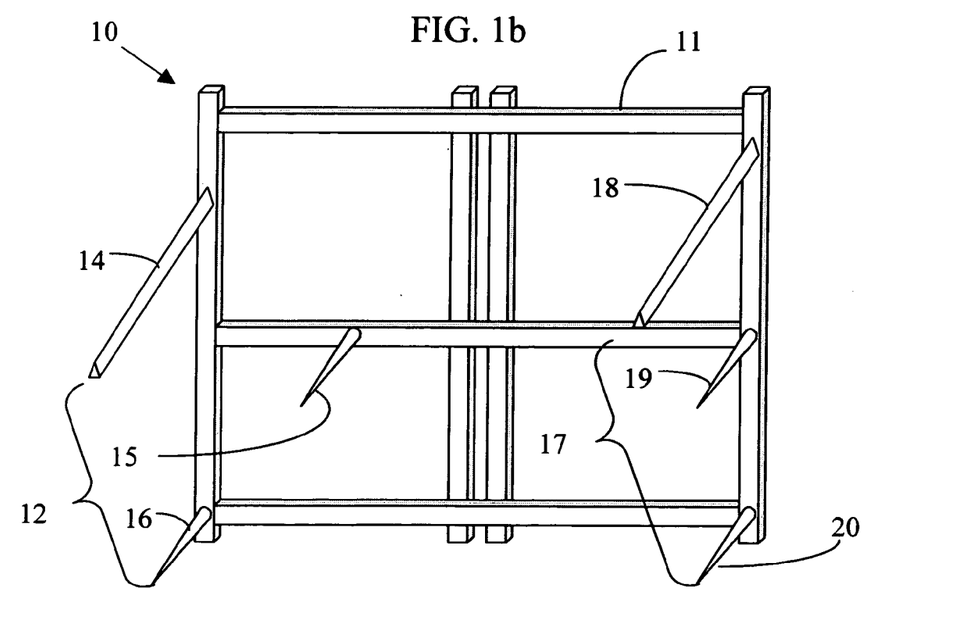

The bale handling and transport apparatus (10) of FIG. 1b comprises a different frame (11) and different sets (12, 17) of spears. The first set (17) comprises a main spear (18), a proximal stabilizer spear (19) and a distal stabilizer spear (20). The distance between the stabilizer spears can be as desired. The distance between the distal stabilizer spear (20) and the main spear (18) is as described above. The distance between the proximal stabilizer spear (19) and the main spear is generally at least 10% and up to about 85% of the average diameter of a bale which the apparatus is adapted to lift and transport. Although, the stabilizer spears (19–20) and the main spear (18) form an essentially straight line, the stabilizer spears (15, 16) and main spear (14) form a triangle rather than a straight line. Accordingly, placement of a stabilizer spear relative to its respective main spear can be varied as desired.

The main spear can be shaped as desired. Its length should be sufficient to penetrate at least about 75% the depth of a bale as measured in the direction in which the spear penetrates the bale. The main spear can be longer than the depth of the bale. For example, for a cylindrical bale, its depth is measured as the distance between the two flat ends of the cylinder. When the main spear penetrates the bale in a direction approximately parallel to the central axis of the cylinder, the main spear will generally be at least 70% or greater than 75% of the depth of the bale. The length of a stabilizer spear is generally at least about 25% or 30% of the depth of a bale as measured in the direction in which the spear penetrates the bale. The preferred length of the main spear is about 3–5 ft. or 3–4 ft.

The cross-sectional shape of the spears can be shaped as desired. For, example, the cross-section can assume any geometric shape including a circle, oval, ellipse, trapezoid, triangle, square, parallelogram, pentagon, hexagon, figure having seven or more sides, multi-pointed star, diamond, semicircle, cross, or any other shape. The cross-section can by symmetrical or asymmetrical. The cross-sectional shape of the spears (4–7) is a circle; however, the cross-sectional shape of the spears (14, 18) is a triangle.

The cross-sectional diameter of the spears can remain constant or change throughout its length. For example, the spears (4–7) possess a constant cross-sectional diameter, where the main spear has a larger diameter than a stabilizer spear. On the other hand, the spears (14–16, 18–20) are tapered and possess a changing cross-sectional diameter. The spears (15–16, 19–20) are pointed and conical. By employing a tapered cross-sectional diameter, the spears are more easily inserted into and extracted from a bale.

The surface of the spears can be smooth, regular, irregular, rough, barbed, serrated, knurled, cross-hatched, etched, or spiral. The surface can be uncoated or coated. Coating material may serve to material protect the spear or improve its performance.

Figure 2:
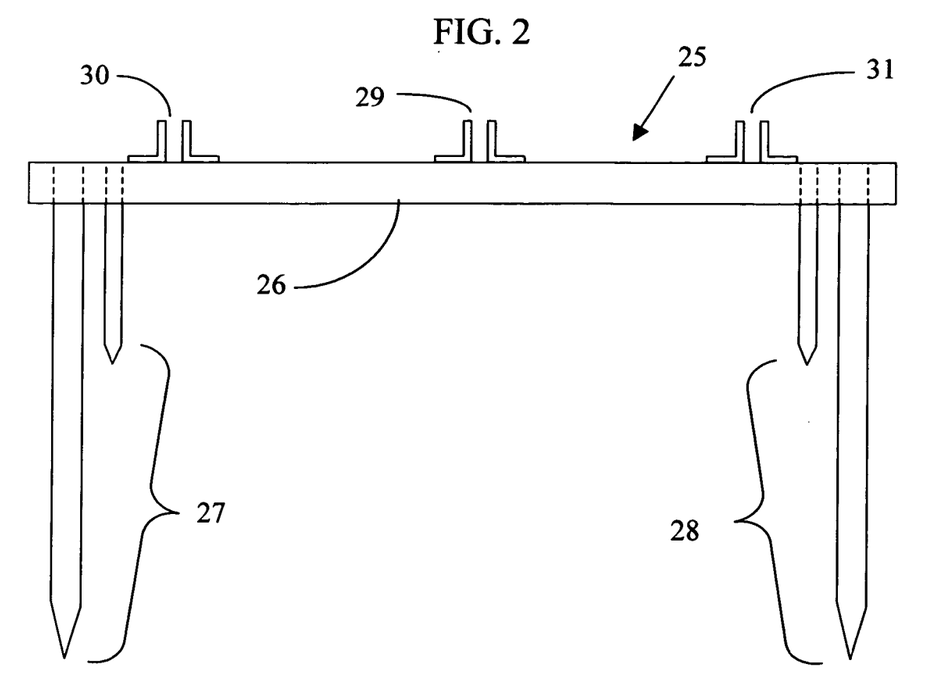

FIG. 2 depicts a top plan view of a bale handling apparatus (25) comprising a mounting assembly (29–31), frame (26), first set of spears (27) and second set of spears (28). Each main spear is vertically and horizontally offset with respect to its corresponding stabilizer spear. The mounting assembly comprising three mounting bracket assemblies (29–31). In this exemplary embodiment, the mounting assembly is adapted for mounting onto a complementary three-point hitch, such as found on a farm tractor. The mounting assembly is bolted, latched or otherwise engaged with or secured to a complementary mounting assembly of operating equipment used to operate the bale handling apparatus.

Figure 3:
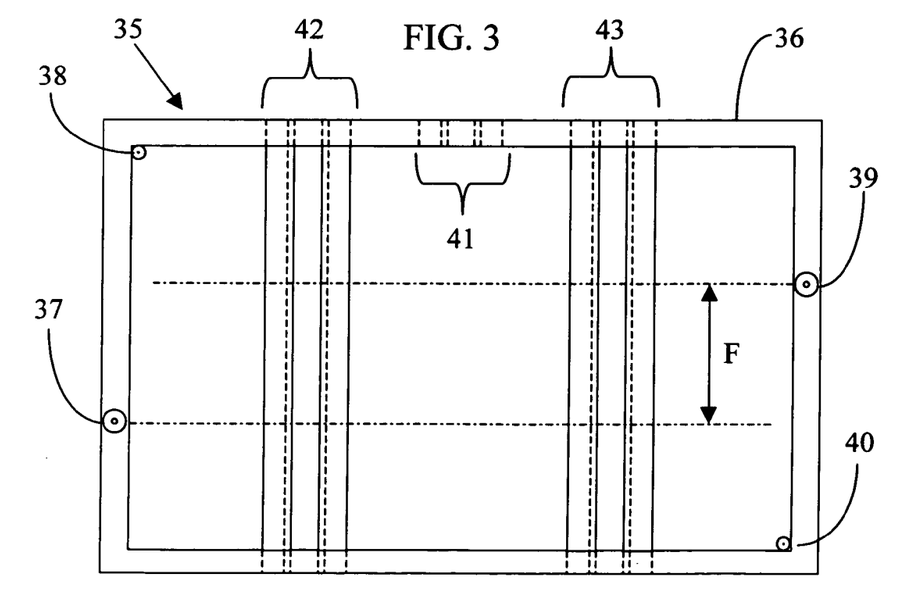
FIG. 3 depicts a front elevation view of an alternate embodiment of the hay bale lifting and transport apparatus.

An alternate embodiment of the bale handling apparatus (35) is depicted in FIG. 3, which is a front elevation view. The apparatus (35) comprises two main spears (37, 39) and respective stabilizer spears (38, 40). The spears are pointed and substantially cylindrical. The main spears are vertically offset from each other by a distance (F). In this embodiment, the stabilizer spears are on opposite corners of the frame (36) such that the stabilizer spear (38) is above its respective main spear (37), and the stabilizer spear (40) is below its respective main spear (39). The uppermost mounting bracket assembly (41) is attached to the upper crossbar of the frame. The other mounting bracket assemblies (42, 43) are paired opposing L-shaped bars adapted to receive and engage with a complementary mounting assembly of an operating equipment.

Figures 4, 5:
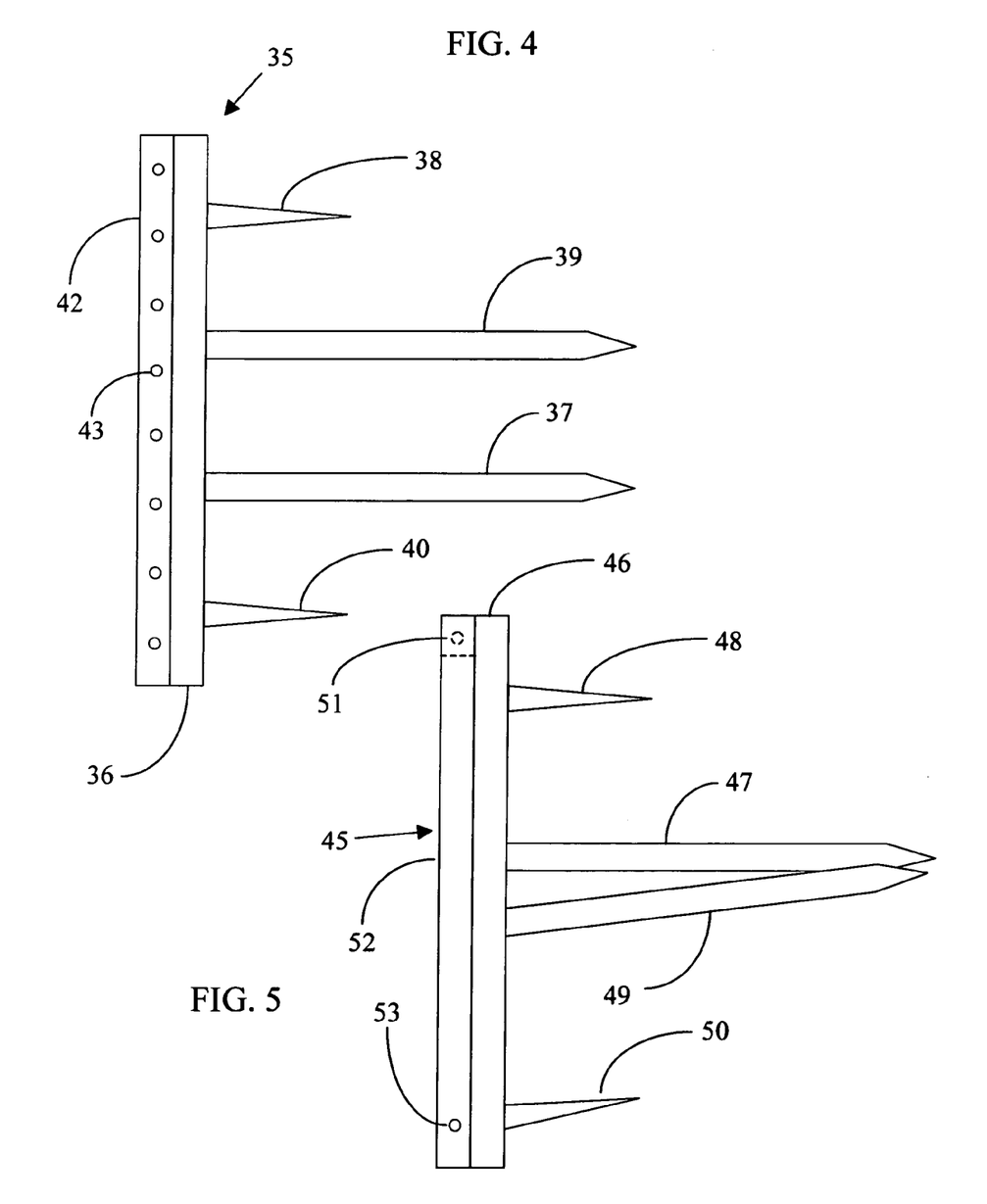
FIG. 4 depicts a side elevation view of the hay bale lifting and transport apparatus of FIG. 3.
FIG. 5 depicts a side elevation view of an alternate embodiment of the hay bale lifting and transport apparatus of FIG. 3.

FIG. 4 depicts side view elevation of a first embodiment of the apparatus (35) of FIG. 3. The extended L-shaped bar of the mounting assembly (42) comprises one or more holes (43) by way of which the mounting assembly can be engaged with the operating equipment. The stabilizer spears (38, 40) are conical and pointed, whereas the main spears (37, 39) are cylindrical and pointed. According to FIGS. 3 and 4, the axes of the spears are substantially parallel. However, the alternate embodiment (45) depicted in FIG. 5 comprises a main spear (49) that is not vertically parallel with the main spear (47) and a stabilizer spear (50) that is not parallel with the stabilizer spear (48). However, each stabilizer spear is substantially parallel with its respective main spear. Even though the main spears (47, 49) are not parallel when viewed from the side they can still be parallel when viewed from the top or front of the apparatus. That said, each set of spears is independently parallel or nonparallel with another set of spears. It is only necessary that each of the spears point away from the front of the apparatus. The apparatus (45) comprises an extended L-shaped rod (52) including an integral mounting assembly (53). The uppermost mounting assembly (51) is depicted in ghost and is attached to the upper crossbar of the frame (46).

The frame can be shaped as desired to form a rectangle, square, triangle or other geometric form. Specific embodiments of the frame include those wherein the frame is asymmetric or symmetric.

The apparatus of the invention can be mounted on any suitable operating equipment. Specific embodiments include those wherein the apparatus is mounted on farm equipment, in particular a tractor. More specific embodiments includes those wherein the apparatus is adapted for mounting onto the front-end or rear-end of a tractor. The apparatus can be secured or attached to a front-end loader of a tractor or can be mounted in its place. The apparatus can be modified as disclosed in the above-cited U.S. patents for mounting onto the front-end or rear-end of a tractor.

As used herein, the term bale refers to a large pressed bundle of goods. Such goods include hay, cotton, grass, alfalfa, wheat, oats, cane, sorghum, and other produce, grains or grasses.

The apparatus of the invention can be tailored to lift and transport any size or shape bales. Typically, bales are round, cylindrical, square-cubic, or rectangular-cubic.

Figure 6:
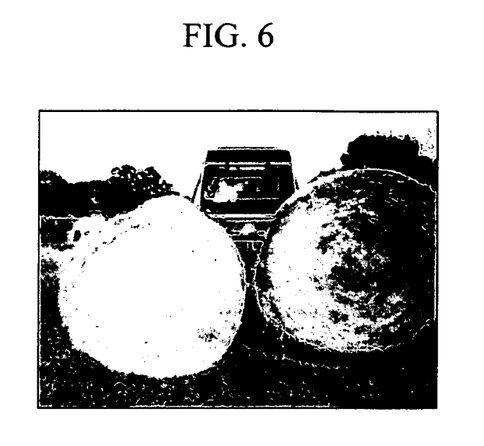
FIG. 6 depicts a front-elevation photo of two bales having just been loaded onto the transport apparatus.

FIG. 6 depicts a front-elevation photo of two bales (B1 and B2) having just been loaded sequentially onto an exemplary transport apparatus that is mounted onto a three-point hitch of a tractor. The lower bale (I) and upper bale (II) are offset by a vertical distance. The vertical offset of the bales approximates the vertical offset of the base of the two main spears of the apparatus. In this embodiment, the vertical offset is near its maximum. The second bale (B2) is on the ground just after it has been speared by the second main spear, while the first bale (B1) is raised from the ground, it having previously been loaded onto the first main spear. Without the minimum vertical offset, as set forth above, of the bases of the main spears, it would not be possible to load the second bale onto the transport apparatus without seriously damaging the first bale already loaded onto the transport apparatus. Moreover, without the minimum vertical offset of the base of the main spears, the first bale would collide with the ground during any attempt to load and would impede with the loading of the second bale. It should be noted that the horizontal offset of the base of the main spears is typically greater than the diameter of a single bale but less than the twice the diameter of a single bale. In this case, the horizontal offset is about 6.5 ft. Since the vertical offset of the main spears is as set forth herein, the two bales can be unloaded simultaneously by placing them on the ground and withdrawing the main spears therefrom.

Figure 7:
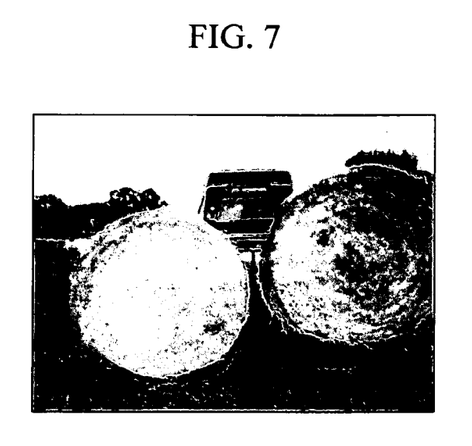
FIG. 7 depicts a front-elevation photo of two bales being transported by the transport apparatus.

FIG. 7 depicts a front-elevation photo of two bales being transported by the transport apparatus of FIG. 6. In this case, the bales are in transport from separate loading sites to a common storage site. The bales were loaded sequentially. However, rather than having to unload the bales individually as is done with prior art apparatus, the present apparatus permits the substantially simultaneous unloading of both bales substantially immediately adjacent one another, e.g. within 0 to 12 in. or 0 to 8 in. or 0 to 6 in. of each other. The claimed design is clearly advantageous over other known systems as it improves transport efficiency thereby minimizing effort and time involved in transporting hay bales. It should be noted that the apparatus of the invention can be used to load bales simultaneously or sequentially and unload bales simultaneously or sequentially. This versatility is not found in other known apparatus having stationary main spears.

Figure 8:
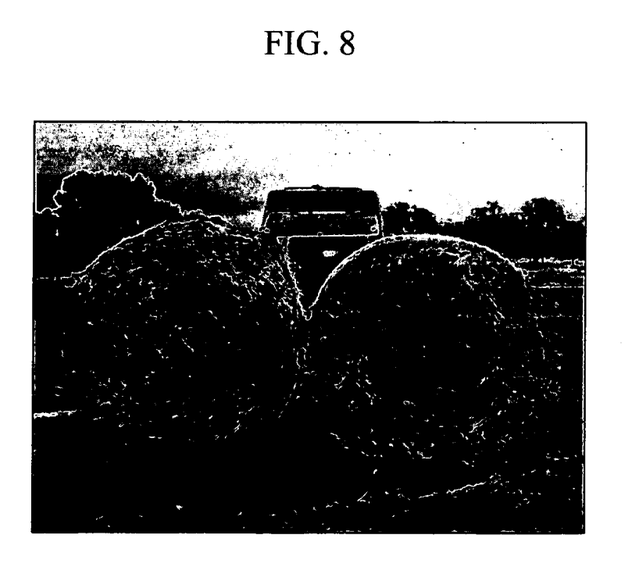
FIG. 8 depicts a front-elevation photo of two bales being transported by another embodiment of the transport apparatus.

FIG. 8 depicts a front-elevation photo of two bales being transported by another embodiment of the transport apparatus. In this case, the vertical offset of the base of the main spears is approximately at the lower limit of the permissible range set forth above. The vertical offset of the base of the main spears is about 6"–8". As a result, when two bales are properly loaded onto the apparatus (by spearing them at about their center), they are vertically offset by a distance approximating the vertical offset of the main spears. Such a construction still permits the individual loading and simultaneous unloading of the bales loaded onto the transport apparatus. Unlike FIG. 7, the horizontal offset of the base of the main spears is near the lower end of the permissible range set forth above. The horizontal offset of the base of the main spears is greater than the diameter of a single bale but less than 1.2 times the diameter of a single bale. In this case, the horizontal offset is about 6.0 to 6.5 ft.

In view of the above description and the attached drawings, one of ordinary skill in the art will be able to practice the invention as claimed without undue experimentation. The foregoing will be better understood with reference to the specification that details certain procedures for the preparation of an apparatus according to the present invention. All references made to these examples are for the purposes of illustration. Examples herein should not be considered exhaustive, but merely illustrative of only a few of the many embodiments contemplated by the present invention.

The above is a detailed description of particular embodiments of the invention. It will be appreciated that, although specific embodiments of the invention have been described herein for purposes of illustration, various modifications may be made without departing from the spirit and scope of the invention. Accordingly, the invention is not limited except as by the appended claims. All of the embodiments disclosed and claimed herein can be made and executed without undue experimentation in light of the present disclosure.

I claim:

1. A bale handling apparatus adapted to simultaneously transport two bales comprising:
   a mounting assembly;
   a frame onto which the mounting assembly is attached;
   a first set of spears comprising a first main spear and a spaced away first stabilizer spear; and
   a second set of spears comprising a second main spear and a spaced away second stabilizer spear; wherein
   the first and second sets of spears are horizontally offset from each other and are attached to the frame;
   the base of the first main spear is vertically offset from the base of the second main spear by about 4 in. to 16 in.; and
   the base of the first main spear is horizontally offset from the base of the second main spear by about 4 ft. to about 7 ft.;
   the main spears are longer and larger in diameter than the stabilizer spears; and
   each set of spears comprises a single main spear and one or more stabilizer spears.

2. The apparatus of claim 1, wherein the apparatus comprises plural first stabilizer spears and/or plural second stabilizer spears.

3. The apparatus of claim 1, wherein the mounting assembly is adapted for mounting the apparatus onto a three-point hitch.

4. The apparatus of claim 1, wherein the base of the first main spear is horizontally offset from the base of the second main spear by about 4.3 ft. to 6.5 ft.

5. The apparatus of claim 4, wherein at least one stabilizer spear of each set of spears is spaced away from its respective main spear by about 1 ft to 1.5 ft., or about 1.25 ft. to about 2 ft.

6. The apparatus of claim 1, wherein at least one stabilizer spear of each set of spears is spaced away from its respective main spear by about 1 ft to 1.5 ft. or about 1.25 ft. to about 2 ft.

7. The apparatus of claim 6, wherein the base of the first main spear is vertically offset from the base of the second main spear by 6 in. to 12 in.

8. The apparatus of claim 1, wherein the base of the first main spear is vertically offset from the base of the second main spear by 6 in. to 12 in.

9. The apparatus of claim 1, wherein at least one stabilizer spear in each set of spears is horizontally offset with respect to its respective main spear.

10. The apparatus of claim 1, wherein the mounting assembly comprises plural mounting brackets.

11. The apparatus of claim 1, wherein each set of spears comprises a single stabilizer spear.

12. The apparatus of claim 1, wherein the apparatus is adapted to simultaneously unload two bales that have been loaded onto the apparatus.

13. A bale handling apparatus adapted to mount onto operating equipment and for simultaneously transporting two bales, the apparatus comprising:
   a frame or body comprising a mounting assembly adapted to engage with a complementary mounting assembly of operating equipment;
   a first set of spears engaged with the frame and comprising a single first main spear and one or more spaced away first stabilizer spears; and
   a second set of spears engaged with the frame and comprising a single second main spear and one or more spaced away second stabilizer spears; wherein
   the first and second sets of spears are horizontally offset from each other;
   the base of the first main spear is vertically offset from the base of the second main spear by about 4 in. to 14 in.; and
   the base of the first main spear is horizontally offset from the base of the second main spear by about 4 ft. to about 6.75 ft.;
   the main spears are longer and/or larger in diameter than their respective stabilizer spears.

14. The apparatus of claim 13, wherein the mounting assembly is adapted for mounting the apparatus onto a three-point hitch.

15. The apparatus of claim 13, wherein the base of the first main spear is horizontally offset from the base of the second main spear by about 4.3 ft. to about 6.5 ft.

16. The apparatus of claim 13, wherein the base of the first main spear is horizontally offset from the base of the second main spear by about 4 ft. to about 4.5 ft., or about 6 ft. to about 6.75 ft.

17. The apparatus of claim 16, wherein the base of the first main spear is vertically offset from the base of the second main spear by about 6 in. to about 12 in.

18. The apparatus of claim 17, wherein at least one stabilizer spear of each set of spears is spaced away from its respective main spear by a distance of about 1 ft to 1.5 ft., or about 1.25 ft. to about 2 ft.

19. The apparatus of claim 16, wherein at least one stabilizer spear of each set of spears is spaced away from its respective main spear by a distance of about 1 ft to 1.5 ft., or about 1.25 ft. to about 2 ft.

20. The apparatus of claim 13, wherein the base of the first main spear is vertically offset from the base of the second main spear by about 6 in. to about 12 in.

21. The apparatus of claim 20, wherein at least one stabilizer spear of each set of spears is spaced away from its respective main spear by a distance of about 1 ft to 1.5 ft., or about 1.25 ft. to about 2 ft.

22. The apparatus of claim 13, wherein at least one stabilizer spear is horizontally offset with respect to its respective main spear.

23. The apparatus of claim 13, wherein the mounting assembly comprises plural mounting brackets.

24. The apparatus of claim 13, wherein each set of spears comprises a single stabilizer spear.

25. The apparatus of claim 13, wherein the apparatus is adapted to simultaneously unload two bales that have been loaded onto the apparatus.

26. A bale handling apparatus adapted for mounting to operating equipment, the apparatus comprising:
   a frame or body comprising a mounting assembly adapted to engage with a complementary mounting assembly of operating equipment;
   a first set of spears engaged with the frame and comprising a single first main spear and one or more spaced away first stabilizer spears; and
   a second set of spears engaged with the frame and comprising a single second main spear and one or more spaced away second stabilizer spears; wherein
   the first and second sets of spears are horizontally offset from each other;
   the base of the first main spear is vertically offset from the base of the second main spear by about 6 in. to about 12 in.;
   the base of the first main spear is horizontally offset from the base of the second main spear by about 4 ft. to about 4.75 ft., or about 6 ft. to about 6.75 ft.; and at least one stabilizer spear of each set of spears is spaced away from its respective main spear by a distance of about 1 ft to 1.5 ft., or about 1.25 ft. to about 2 ft.

27. The apparatus of claim 26, wherein the base of the first main spear is horizontally offset from the base of the second main spear by about 4 ft. to about 4.75 ft.; and at least one stabilizer spear of each set of spears is spaced away from its respective main spear by a distance of about 1 ft to 1.5 ft.

28. The apparatus of claim 26, wherein the base of the first main spear is horizontally offset from the base of the second main spear by about 6 ft. to about 6.75 ft.; and at least one stabilizer spear of each set of spears is spaced away from its respective main spear by a distance of about 1.25 ft. to about 2 ft.

* * * * *